US008386852B2

(12) United States Patent
Cohen et al.

(10) Patent No.: US 8,386,852 B2
(45) Date of Patent: Feb. 26, 2013

(54) AUTOMATED RECORDING AND REPLAYING OF SOFTWARE REGRESSION TESTS

(75) Inventors: Richard M. Cohen, Austin, TX (US); William H. Vollers, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2402 days.

(21) Appl. No.: 10/287,794

(22) Filed: Nov. 5, 2002

(65) Prior Publication Data

US 2004/0088602 A1    May 6, 2004

(51) Int. Cl.
*G06F 11/00* (2006.01)

(52) U.S. Cl. .......................................... 714/38.1; 714/33

(58) Field of Classification Search .................... 714/32, 714/33, 45, 37–39, 38.1; 717/131, 124–128
See application file for complete search history.

(56) References Cited

U.S. PATENT DOCUMENTS

| | | | | |
|---|---|---|---|---|
| 3,707,725 A * | 12/1972 | Dellheim | ........................ | 714/38 |
| 4,437,184 A * | 3/1984 | Cork et al. | ...................... | 714/38 |
| 4,683,532 A * | 7/1987 | Yount et al. | ..................... | 714/38 |
| 4,696,003 A * | 9/1987 | Kerr et al. | ........................ | 714/38 |
| 4,698,785 A * | 10/1987 | Desmond et al. | ............... | 714/38 |
| 4,720,778 A * | 1/1988 | Hall et al. | ....................... | 714/38 |
| 5,022,028 A * | 6/1991 | Edmonds et al. | ............... | 714/38 |
| 5,113,501 A * | 5/1992 | Ishikawa | ......................... | 714/38 |
| 5,157,782 A * | 10/1992 | Tuttle et al. | ...................... | 714/45 |
| 5,218,605 A * | 6/1993 | Low et al. | ....................... | 714/45 |
| 5,335,342 A * | 8/1994 | Pope et al. | ....................... | 714/38 |
| 5,388,253 A * | 2/1995 | Geneste et al. | ................. | 714/38 |
| 5,557,740 A * | 9/1996 | Johnson et al. | ................. | 714/38 |
| 5,594,892 A | 1/1997 | Bonne et al. | | |
| 5,613,063 A * | 3/1997 | Eustace et al. | .................. | 714/38 |
| 5,634,098 A * | 5/1997 | Janniro et al. | ................... | 714/38 |
| 5,673,387 A * | 9/1997 | Chen et al. | ....................... | 714/38 |
| 5,694,540 A * | 12/1997 | Humelsine et al. | ............. | 714/38 |
| 5,758,062 A | 5/1998 | McMahon et al. | | |
| 5,778,169 A * | 7/1998 | Reinhardt | ....................... | 714/38 |
| 5,822,511 A * | 10/1998 | Kashyap et al. | .................. | 714/8 |
| 5,941,995 A * | 8/1999 | Morrison | ......................... | 714/39 |
| 6,061,643 A * | 5/2000 | Walker et al. | ................. | 702/123 |
| 6,236,993 B1 * | 5/2001 | Fanberg | ............................ | 707/6 |
| 6,286,131 B1 | 9/2001 | Beers et al. | | |
| 6,351,845 B1 * | 2/2002 | Hinker et al. | ................. | 717/128 |

(Continued)

OTHER PUBLICATIONS

Pauli, Kevin, "Pattern your way to automated regression testing; Implement popular design patterns to overcome unit-testing hurdles," *Java World*, Sep. 2001.

*Primary Examiner* — Scott Baderman
*Assistant Examiner* — Elmira Mehrmanesh

(57) ABSTRACT

A method of regression testing a software application in an execution environment is disclosed. The software application interacts with a data storage and is run a first time. While running the software application for the first time, interactions of the software application with the data storage are monitored. Also while running the software application for the first time, first output data written from the software application to the data storage are recorded, and input data received by the software application from the data storage are recorded. The software application is run a second time after the first time. While running the software application the second time, when the software application calls for data from the data storage, at least a portion of the recorded input data is provided to the software application, and, when the software application writes data to the data storage, second output data written by the software application are recorded. The second output data are compared with the first output data to evaluate whether the software application has passed the regression test.

20 Claims, 7 Drawing Sheets

U.S. PATENT DOCUMENTS

| | | | |
|---|---|---|---|
| 6,415,394 B1 * | 7/2002 | Fruehling et al. | 714/30 |
| 6,427,000 B1 | 7/2002 | Mumford et al. | |
| 6,889,337 B1 * | 5/2005 | Yee | 714/1 |
| 6,966,013 B2 * | 11/2005 | Blum et al. | 714/38.1 |
| 2002/0161700 A1 * | 10/2002 | Ernst et al. | 705/38 |
| 2003/0018932 A1 * | 1/2003 | Blum et al. | 714/46 |
| 2005/0278576 A1 * | 12/2005 | Hekmatpour | 714/37 |
| 2006/0212540 A1 * | 9/2006 | Chon et al. | 709/218 |

* cited by examiner

AUTOMATED RECORDING AND REPLAYING OF SOFTWARE REGRESSION TESTS

BACKGROUND

Computer software applications often are developed through a trial-and-error testing process. In such a process, an application is written and the behavior of the application is tested. The application is then modified based on the tested behavior, and the modified application is retested. Testing the application after a modification has been made is useful for determining whether the behavior of the application has regressed as a result of the modification. Such testing may be referred to as "regression testing."

Regression testing of software applications that interact with other applications or external sources/destinations for data (e.g., a database) may pose particular difficulties because of the complexity of the interactions with the external sources/destinations. For example, testing an application that interacts with a database may require restoration of all or a portion of the database to a known state at the start of each test to ensure that the application is always tested against the same data. Custom-built software scripts can be used to simulate a database by sending and receiving only the data required by a software application during a regression test. However, when a computation is performed by executing a sequence of software applications that interact with, and sometimes alter, a database, regression testing the individual software applications may be difficult because each application may require that the database be in a particular known, intermediate state when the application begins to interact with the database.

SUMMARY

In one general aspect, regression testing a software application in an execution environment includes running a software application that interacts with one or more data storages. While running the software application, interactions of the software application with the one or more data storages are monitored. Also while running the software application, first output data written from the software application to the one or more data storages are recorded, as are input data received by the software application from the one or more data storage. The software application is later run a second time. While running the software application the second time, when the software application calls for data from the one or more data storages, at least a portion of the recorded input data is provided to the software application, and, when the software application attempts to write data to the one or more data storages, the data are recorded as second output data written by the software application. The second output data are compared with the first output data to evaluate whether the software application has passed the regression test.

Implementations may include one or more of the following features. For example, one or more data storages may be a database or another software application. The software application may be modified after running the software application the first time and before running the software application the second time. Similarly, the execution environment in which the software application runs may be modified after running the software application the first time and before running the software application the second time. Modifications to the execution environment may include modifications to the operating system of the execution environment and modifications to the hardware platform of the execution environment.

In another general aspect, a system for regression testing a software application in an execution environment in which the software application interacts with a data storage includes a processor and memory. The processor is configured to execute instructions contained in the software application at a first time and to monitor interactions between the software application and the data storage. While the application is running the first time, the processor records in the memory first output data written from the software application to the data storage. The processor also records in the memory input data provided to the software application by the data storage. The processor is also configured to execute instructions contained in the software application at a second time later than the first time, and to input at least a portion of the recorded input data to the software application when the software application calls for data from the data storage. The processor records in the memory second output data written by the software application when the software application attempts to write data to the data storage when running the second time. The processor is also configured to compare the second output data with the first output data to evaluate whether the software application has passed the regression test.

Implementations may include one or more of the following features. For example, the data storage may be a database or another software application. The processor may be further configured to modify the software application after running the software application the first time and before running the software application the second time. The processor also may be further configured to modify the execution environment in which the software application runs after running the software application the first time and before running the software application the second time. The modification of the execution may include a modification of the operating system of the execution environment.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
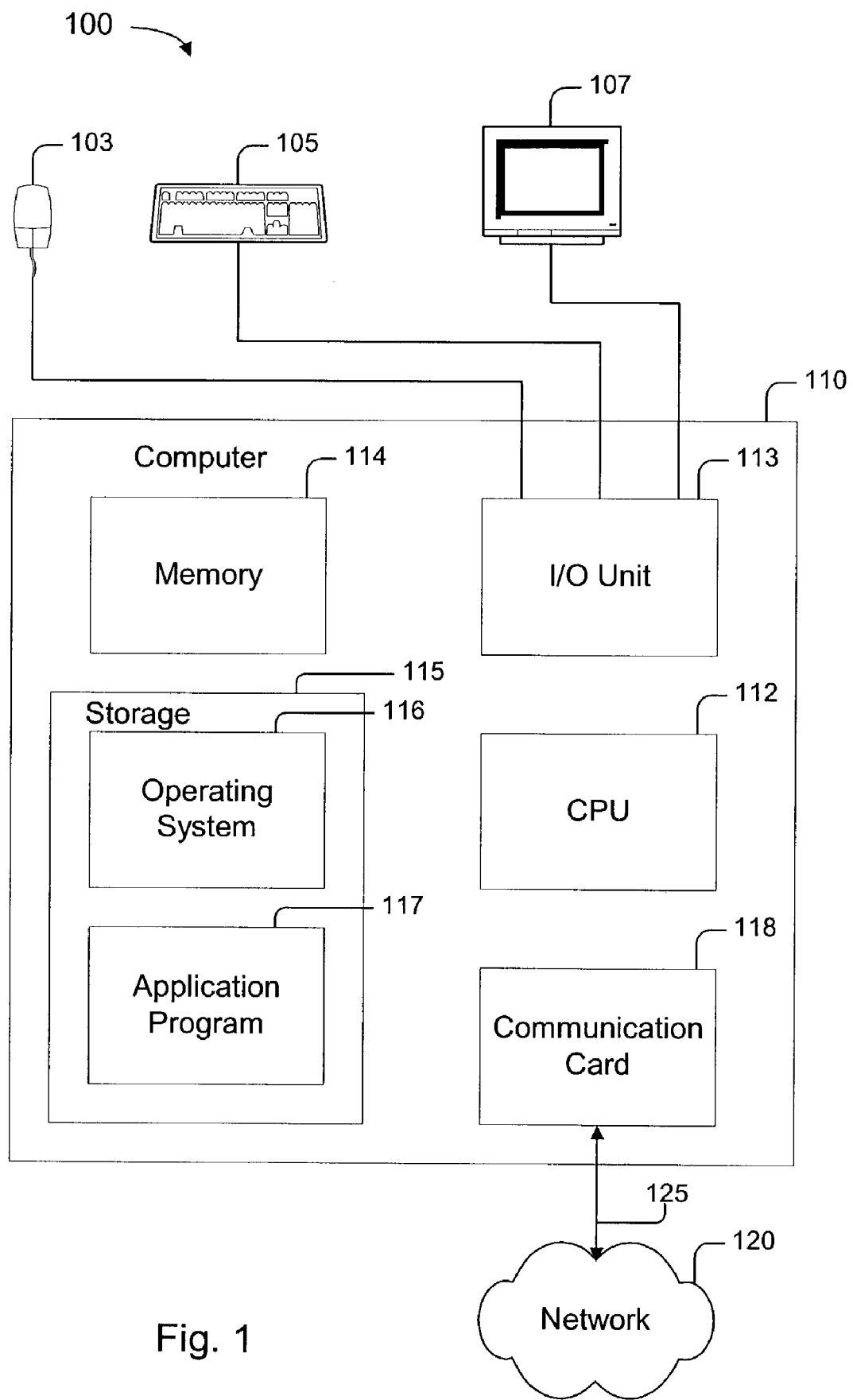
FIG. 1 is a schematic diagram of a system for automatically recording and replaying software regression tests.

Referring to FIG. 1, exemplary components of a system 100 that may be used to automatically record and replay software regression tests include various input/output (I/O) devices (e.g., mouse 103, keyboard 105, and display 107) and a general purpose computer 110 having a central processor unit (CPU) 112, an I/O unit 113, memory 114, and a storage device 115. Storage device 115 may store machine-executable instructions, data, and various programs, such as an operating system 116 and one or more application programs 117, all of which may be processed by CPU 112. Each computer application may be implemented in a high-level procedural or object-oriented programming language, or in assembly or machine language if desired. The language may be a compiled or interpreted language. Data storage device 115 may be any form of non-volatile memory, including, for example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM).

Computer system 110 may also include some sort of communications card or device 118 (e.g., a modem or a network adapter) for exchanging data with a network 120 through a communications link 125 (e.g., a telephone line, a wireless network link, a wired network link, or a cable network). Other systems, such as a computer system, similar to the system shown in FIG. 1, may be connected to computer system 110 through network 120 and may exchange data, information, and instructions with computer system 110. Other examples of system 100 include a handheld device, a workstation, a server, a device, a component, other equipment of some combination thereof capable of responding to and executing instructions in a defined manner. Any of the foregoing may be supplemented by, or incorporated in, application-specific integrated circuits (ASICs).

Figure 2:
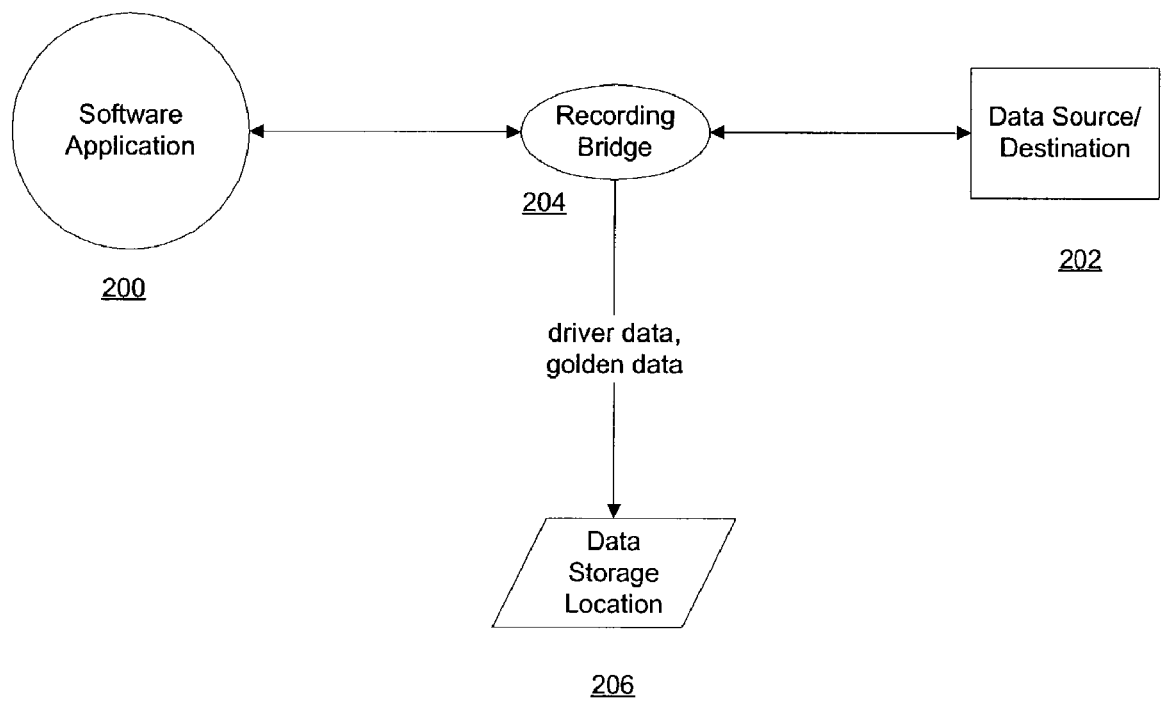
FIG. 2 is a block diagram of a system that automatically records a software regression test.

Referring to FIG. 2, a software application 200 may communicate with an external data source/destination 202. Data source/destination 202 may be located on the same computer system as software application 200 or may be located on a different computer system. Data source/destination 202 may be any source of data input to software application 200 and/or may be any destination for data exported from software application 200 when the software application is running.

When software application 200 runs, recording bridge 204 monitors the data traffic between software application 200 and data source/destination 202. While software application 200 is running, all data written to the application from data source/destination 202 are automatically copied by recording bridge 204 and written sequentially to data storage location 206, where they are stored as "driver data" for later retrieval. For example, each uninterrupted parcel of driver data returned from data source/destination 202 may be stored in a separate file that is identified by a naming scheme. The file naming scheme may keep track of the order in which the driver data were returned from data source/destination 202 and written to data storage location 206 and what data are contained in each file. Parcels of driver data need not be stored in separate files, and may also be stored, for example, in a single data file, in a database, or in a Java® application, any of which is able to maintain the order in which the parcels were returned from data source/destination 202.

Similarly, while software application 200 is running, all data written from software application 200 to data source/destination 202 are copied by recording bridge 204 and written sequentially to data storage location 206, where they are stored as "golden data" for later retrieval. For example, recording bridge 204 may write golden data to data storage location 206 sequentially, as data are received from software application 200, and may store each parcel of uninterrupted data sent from the software application in a separate file. Each file may be identified by a naming scheme that keeps track of the order in which the data were sent from software application 200 and written to data storage location 206. Thus, for example, if software application 200 sends queries Q1, Q2, and Q3 to data source/destination 202 and data source/destination responds to the queries with responses R1, R2, and R3, respectively, the driver data stored on data storage location 206 may consist of three separate files containing the data in responses R1, R2, and R3 and the golden data stored on data storage location 206 may consist of three separate files containing the data in queries Q1, Q2, and Q3.

In a regression test, after software application 200 runs, a modification may be made to the software application or to the software application's environment (including the operating system or the hardware or software platform on which the application runs) and the application may be re-run. Such a modification is generically referred to as a "modified software application," although this term encompasses modifications to the software application's environment, in addition to modifications to the software application itself.

Figure 3:
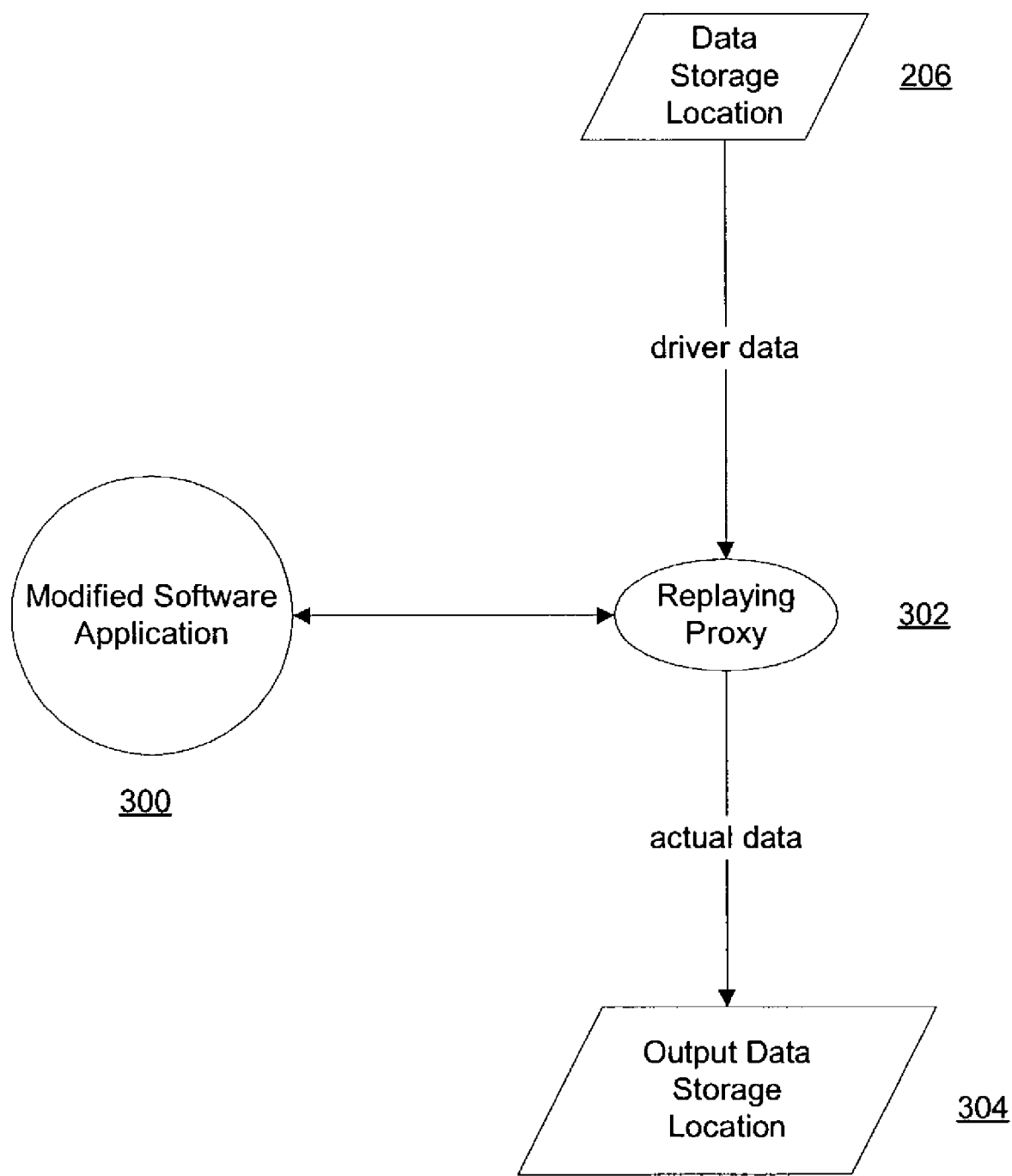
FIG. 3 is a block diagram of a system that automatically replays a software regression test.

Referring to FIG. 3, when the modified software application 300 is re-run, the application 300 interacts with the driver data stored in the data storage location 206 through replaying proxy 302 rather than interacting with data source/destination 202. When modified software application 300 calls for particular data from data source/destination 202, replaying proxy 302 retrieves the appropriate driver data from data storage location 206 and returns the driver data to the modified application, rather than fetching the data from data source/destination 202. Thus, referring to the example of queries Q1, Q2, and Q3 and responses R1, R2, and R3 described above, when modified software application 300 sends query Q1, the query is processed by replaying proxy 302, which then fetches response R1 from data storage location 206 and returns the data in R1 to the modified application. When modified software application 300 writes data nominally destined for data source/destination 202 (e.g., a query), the data are stored as "actual data" in output data storage location 304. Actual data output by modified software application 300 and stored in output data storage location 304 may be compared with golden data that were written from original software application 200. If the actual data output from the modified software application 300 are equivalent to the golden data output from the original program, the regression test of the software application may be deemed successful.

Figure 4:
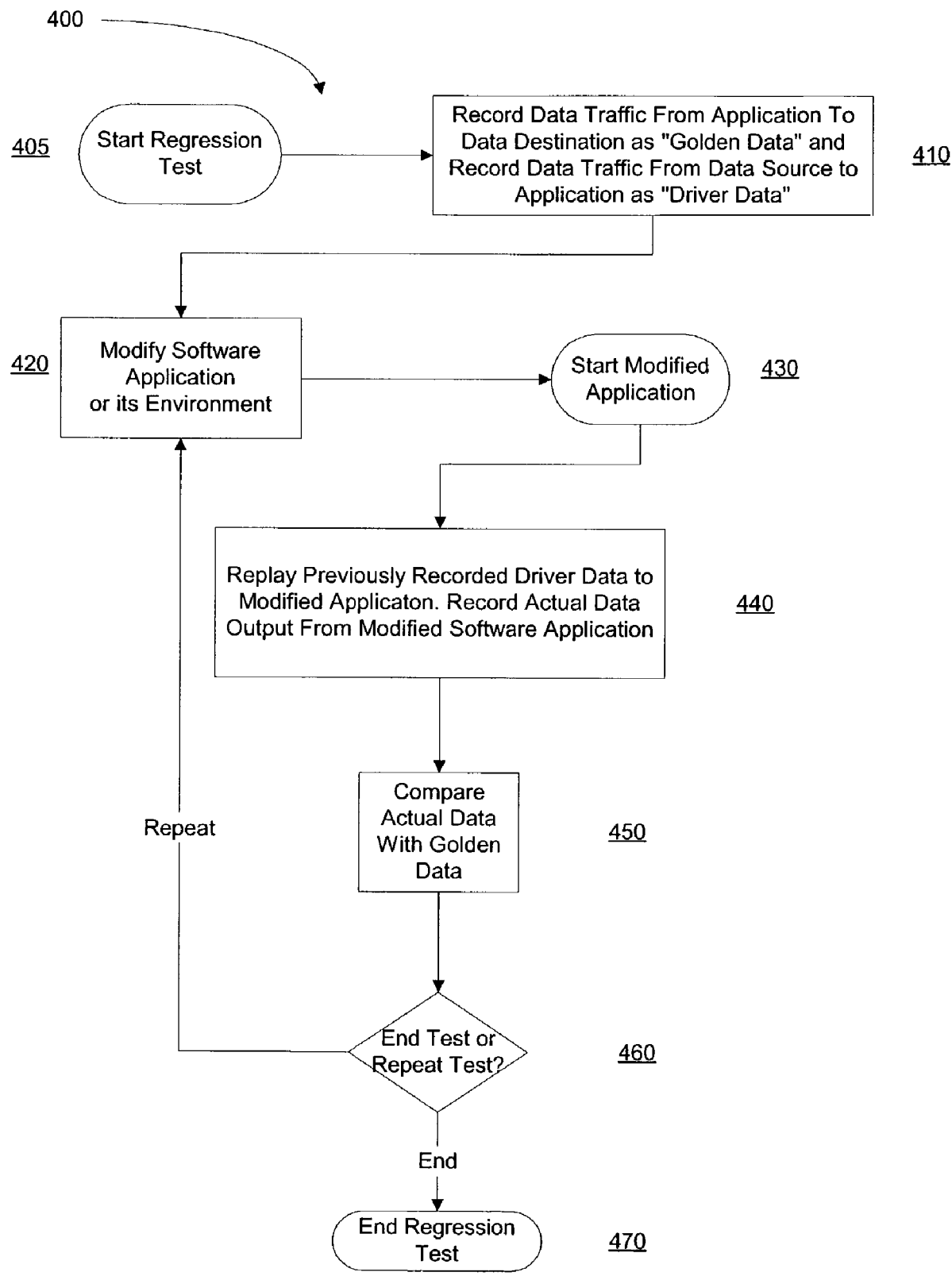
FIG. 4 is a flow chart of a process for automatically recording and replaying a software regression test.

Referring to FIG. 4, a regression testing process 400 for automatically recording and replaying software regression tests includes monitoring the development of a software application program to determine if the behavior of the program regresses during the development process. The regression testing process may be performed throughout the development of the software application as the application is created, modified, and updated.

The process begins with the creation of a software application 200 that interacts with an external data source/destination 202. After the regression test starts (step 405), software application 200 runs, and a recording bridge 204 monitors data traffic between the software application 200 and the data source/destination 202. Recording bridge 204 automatically captures interactions between the application and the data source/destination 202 and automatically records data written from the software application 200 to the data destination 202 as "golden data" and records data written from the data source 202 to the application 200 as "driver data" (step 410). The golden data and the driver data are stored sequentially in a test data storage location 206.

After software application 200 runs and the golden data and driver data have been recorded, a modification is made to the software application or its environment (step 420) and the modification is started (step 430). When the running, modified software application 300 requests data from data source/destination 202, replaying proxy 302 returns data to the modified application which previously were recorded in data storage location 206 (step 440). Data written by modified software application 300 are stored as actual data in a data storage location (step 440). After modified software application 300 ends, the actual data are compared to the golden data to evaluate whether the modified application has passed the regression test (step 450). Then, the regression test may be ended or repeated (step 460). If the test is repeated, the modified software application 300 may be modified again (step 420). If the test is not repeated, the test ends (step 470).

Figure 5:
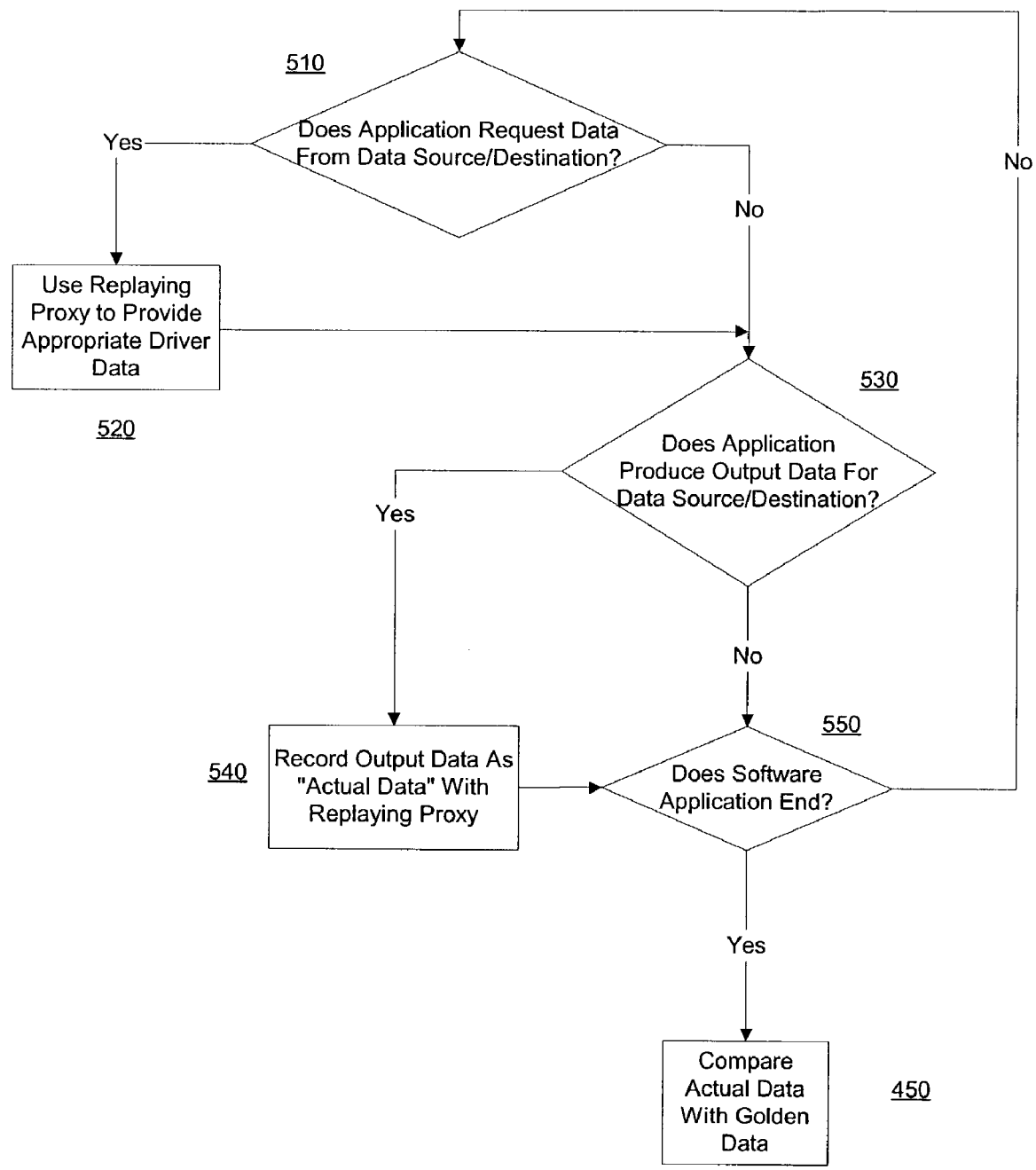
FIG. 5 is a flow chart of a process replaying data during a software regression test.

FIG. 5 illustrates the replaying step (step 440) of the regression test in further detail. During the replaying step, if the running, modified software application 300 requests data from data source/destination (step 510), the appropriate data driver data are returned by a replaying proxy 302, which stands in for the data source 202 (step 520). The appropriate data to be returned to the modified software application 300 may be identified by the naming scheme used to name the files in which the driver data were stored in data storage location 206. For example, when modified software application 300 sends a third query destined for data source/destination 202 and expects a third response to be returned, driver data in a file labeled "third response" may be returned from data storage location 206 to the modified application 300. If the modified software application 300 does not request data from the data source/destination 202 but writes output data destined for the data destination (step 530), these data are copied by replaying proxy 302 and stored as "actual data" in the output data storage location 304 (step 540). Thus, the modified software application 300 does not communicate directly with the data source/destination 202 and interacts only with the replaying proxy 302 and the data storage location 206, which stores far fewer data records that the full data source/destination 202. Also, because the driver data that are returned to the modified software application 300 in step 520 are equivalent to the data that were returned to the software application in step 410, the data source 202 does not need to be restored to its original state before the modified software application 300 is tested.

If the modified software application 300 continues to run and does not end or abort (step 550), the replaying proxy 302 continues to provide driver data from data storage location 206 to the modified software application (step 520) and to route actual data written by the modified software application for storage in the output data storage location 304 (step 540). When the modified application 300 ends or aborts, the actual data written by the modified software application and stored in the output data storage location 304 may be compared with the golden data that were recorded when the software application 200 was first run (step 450). If the actual data are equivalent to the golden data, the modified software application may be considered to have passed the regression test. If the actual data are different from the golden data, the modification may be considered to have failed the regression test.

Figure 6:
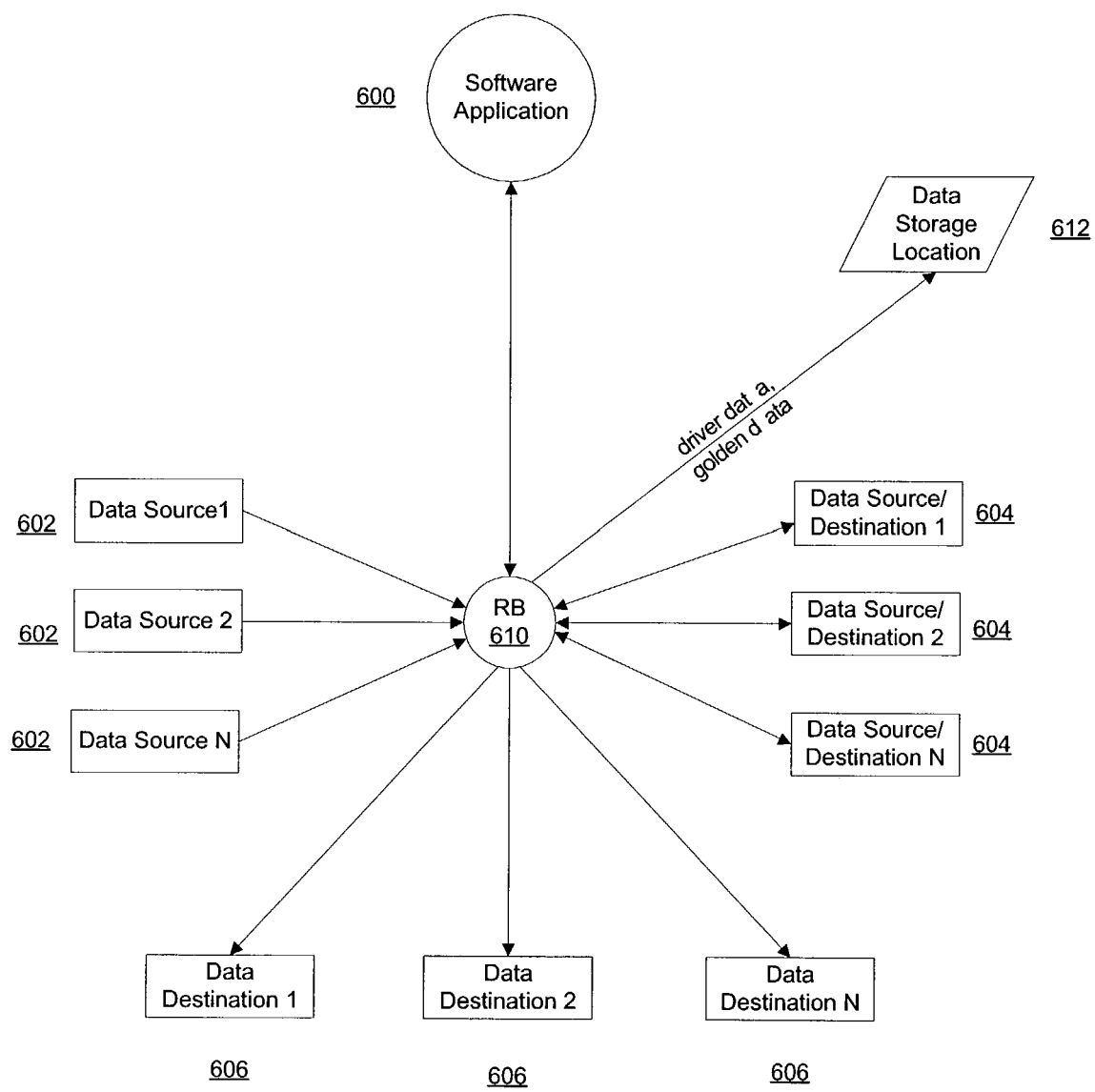
FIG. 6 is a block diagram of a system that automatically records a software regression test involving multiple data sources, destinations, and combined sources/destinations.

Referring to FIG. 6, the techniques described above may be extended to regression testing of a software application 600 that interacts with multiple data sources 602, multiple data destinations 604, and multiple combined data sources/destinations 606. Thus, in order to record a complete regression test for a software application 600, a recording bridge 610 may be used between the program and each source 602, destination 604, and combined source/destination 606 to monitor the data traffic between the unmodified software application and the data sources, destinations, and combined sources/destinations so as to capture interactions between the unmodified application and the sources, destinations, and combined sources/destinations. While software application 600 is running, all data written to the software application 600 from data source/destinations 606 and data sources 620 are copied by recording bridge 610 and written to data storage location 612, where they are stored as driver data. As in the case of a single data source/destination 202, recording bridge 610 copies and writes driver data to data storage location 612 sequentially, as the data are received from the data sources 602 and the combined data sources/destinations 606. Recording bridge 610 may store each uninterrupted parcel of data returned from the data source/destination in a separate file, and each file may be identified by a naming scheme that keeps track of the order in which the data were returned and what is contained in the file. Driver data may also be stored in other formats, such as, for example, in a single text file, a database, or a Java® application. Similarly, all data written from software application 600 to data destinations 604 and to combined data source/destination 606 are copied by recording bridge 610 and written to data storage location 612, where they are stored as golden data. Recording bridge 610 writes golden data to data storage location 612 sequentially, as data are received from software application 600, and may store each parcel of uninterrupted data sent from the software application in a separate file. Each file may be identified by a naming scheme that keeps track of the order in which the data were sent from software application 600 and the contents of the file. Although the system for recording a regression test in FIG. 6 is depicted as having a single recording bridge 610 for recording driver data and golden data from each data source 602, data destination 604, and combined data source/destination 606, separate recording bridges may be used to record data traffic between software application 600 and different data sources, destinations, or combined source/destinations.

Figure 7:
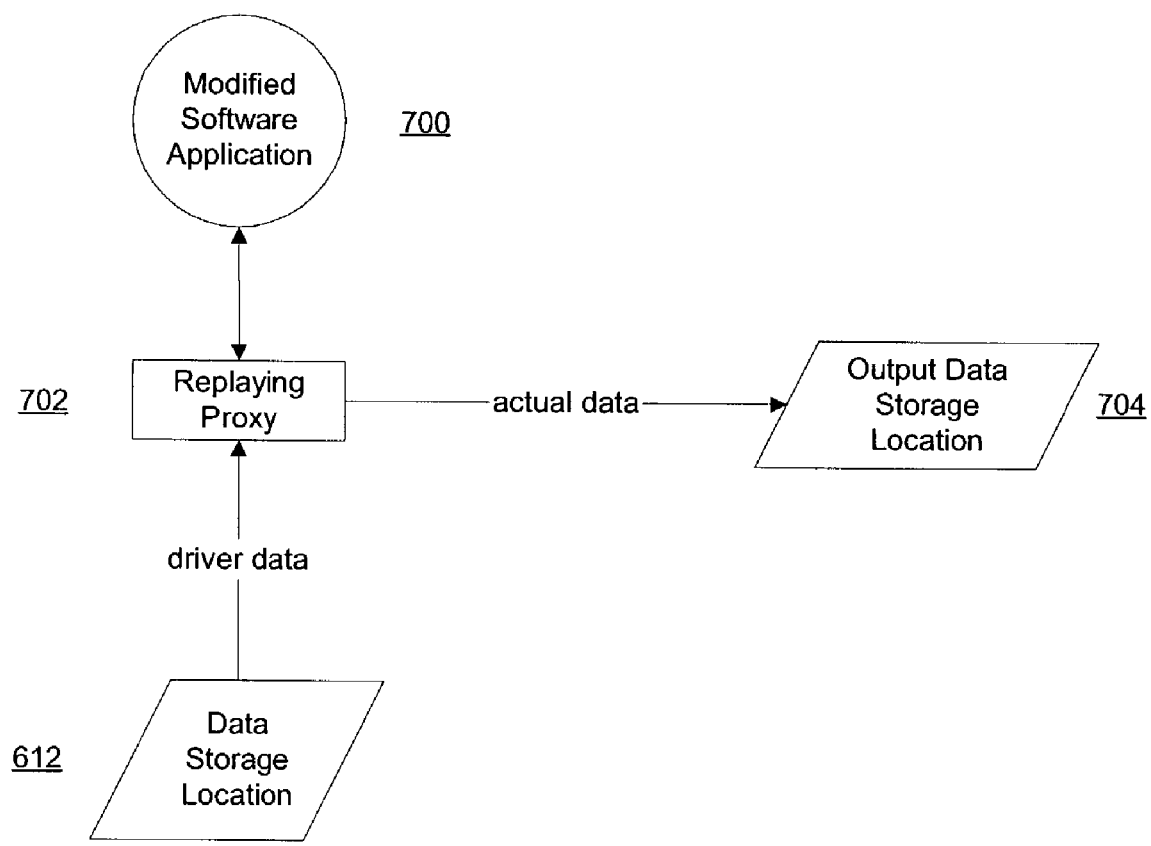
FIG. 7 is a block diagram of a system that automatically replays a software regression test involving multiple data sources, destinations, and combined sources/destinations.

Referring to FIG. 7, after the original software application 600 has been modified, a recorded regression test is replayed using a replaying proxy 702 in place of each source 602, destination 604, and combined source/destination 606. Replaying proxy 702 is used to replay previously recorded driver data when the modified software application 700 requests data from a data source 602 or a combined data source/destination 606. Similarly, replaying proxy 702 is used to copy actual data produced by modified software application 700 and destined for a data destination 604 or a combined data source/destination 606 and record the data on data storage output location 704. The actual data may then be compared to the golden data to evaluate whether the software application has passed the regression test.

Other implementations are within the scope of the following claims.

What is claimed is:

1. A method of regression testing a software application in an execution environment, wherein the software application interacts with a data storage, the method comprising:
  running the software application a first time;
  while running the software application the first time, monitoring interactions of the software application with a data source and a data destination, wherein monitoring the interactions includes:
    copying first communications between the software application and the data destination during the first running time;

copying communications between the software application and the data source, wherein the data source and the data destination comprise data storage; and storing the copied data-destination first communications and the copied data-source communications in memory;

running the software application a second time after running the software application the first time;

while running the software application the second time, when the software application calls for data from the data storage, providing at least a portion of the copied data-source communications to the software application, and, when the software application writes data to the data storage, identifying second communications between the software application and the data destination; and comparing the identified data-destination second communications with the copied data-destination first communications to evaluate whether the software application has passed the regression test.

2. The method of claim 1 wherein the data storage comprises a database.

3. The method of claim 1 wherein the data storage comprises another software application.

4. The method of claim 1 further comprising modifying the software application after running the software application the first time and before running the software application the second time.

5. The method of claim 1 further comprising modifying the execution environment in which the software application runs after running the software application the first time and before running the software application the second time.

6. The method of claim 5 wherein modifying the execution environment comprises modifying the operating system of the execution environment.

7. The method of claim 5 wherein modifying the execution environment comprises modifying the hardware platform of the execution environment.

8. The method of claim 1 wherein the first output data is stored in at least one file having a naming scheme that tracks an order of the first output data and the input data is stored in at least one file having a naming scheme that tracks an order of the input data.

9. A method of regression testing a computer software application in an execution environment, wherein the software application interacts with data storages, the method comprising:

running the software application a first time;

while running the software application, monitoring interactions of the software application with a data source and a data destination, wherein monitoring the interactions includes:

copying first communications between the software application and the data destination during the first running time;

copying communications between the software application and the data source, wherein the data source and the data destination comprise data storage; and storing the copied data-destination first communications and the copied data-source communications in memory;

running the software application a second time after running the software application the first time;

while running the software application the second time, when the software application calls for data from the data storage, providing at least a portion of the copied data-source communications to the software application, and, when the software application writes data to the data storage, identifying second communications between the software application and the data destination; and comparing the identified data-destination second communications with the copied data-destination first communications to evaluate whether the software application has passed the regression test.

10. The method of claim 9 wherein at least one of the data storages comprises a database.

11. The method of claim 9 wherein at least one of the data storages comprises another software application.

12. The method of claim 9 further comprising modifying the software application after running the software application the first time and before running the software application the second time.

13. The method of claim 9 further comprising modifying the execution environment in which the software application runs after running the software application the first time and before running the software application the second time.

14. The method of claim 13 wherein modifying the execution environment comprises modifying the operating system of the execution environment.

15. The method of claim 13 wherein modifying the execution environment comprises modifying the hardware platform of the execution environment.

16. The method of claim 9 further comprising:
tracking an order of the first output data; and
tracking an order of the input data.

17. A system for regression testing a software application in an execution environment, wherein the software application interacts with a data storage, the system comprising:

a memory; and a processor configured to:

monitor interactions between the software application and a data source and a data destination, wherein monitoring the interactions includes recording input data received by the software application from the data source;

execute instructions contained in the software application at a first time using recorded input data in the memory;

monitor interactions between the software application and a data source and a data destination, wherein monitoring the interactions includes recording in the memory first communications between the software application and the data destination when the software application is running at a first time;

execute instructions contained in the software application at a second time later than the first time;

input at least a portion of the recorded input data to the software application when the software application calls for data from the data source;

record in the memory second communications between the software application and the data destination when the software application attempts to write data to the data destination when running the second time; and compare the second communications with the first communications to evaluate whether the software application has passed the regression test.

18. The system of claim 17 wherein the software application is modified after running the software application the first time and before running the software application the second time.

19. The system of claim 17 wherein the execution environment in which the software application runs is modified after running the software application the first time and before running the software application the second time.

20. The system of claim 17 wherein the processor is further configured to store the first output data in at least one file having a naming scheme that tracks an order of the first output data and to store at least a portion of the recorded input data in at least one file having a naming scheme that tracks an order of the at least a portion of the recorded input data.

\* \* \* \* \*